J. RIVERS.
CLAMP.
APPLICATION FILED DEC. 17, 1908.
922,336.
Patented May 18, 1909.
2 SHEETS—SHEET 2.
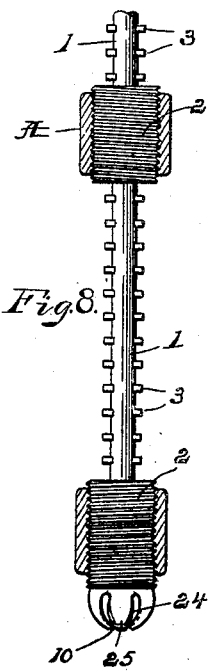
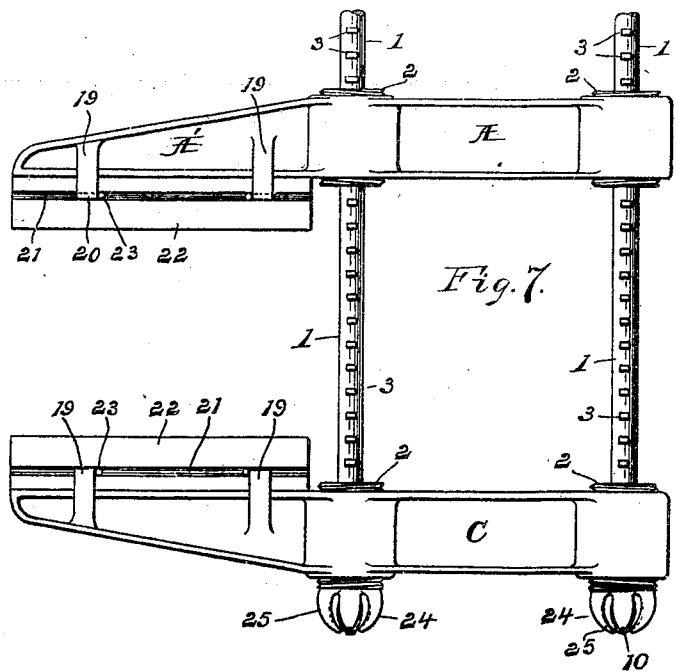
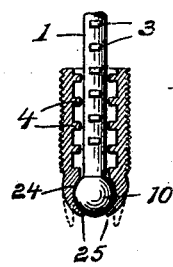
Witnesses
G. E. McGlynn
A. Warnock
Inventor
John Rivers
By Lewis E. Flanders
Attorney

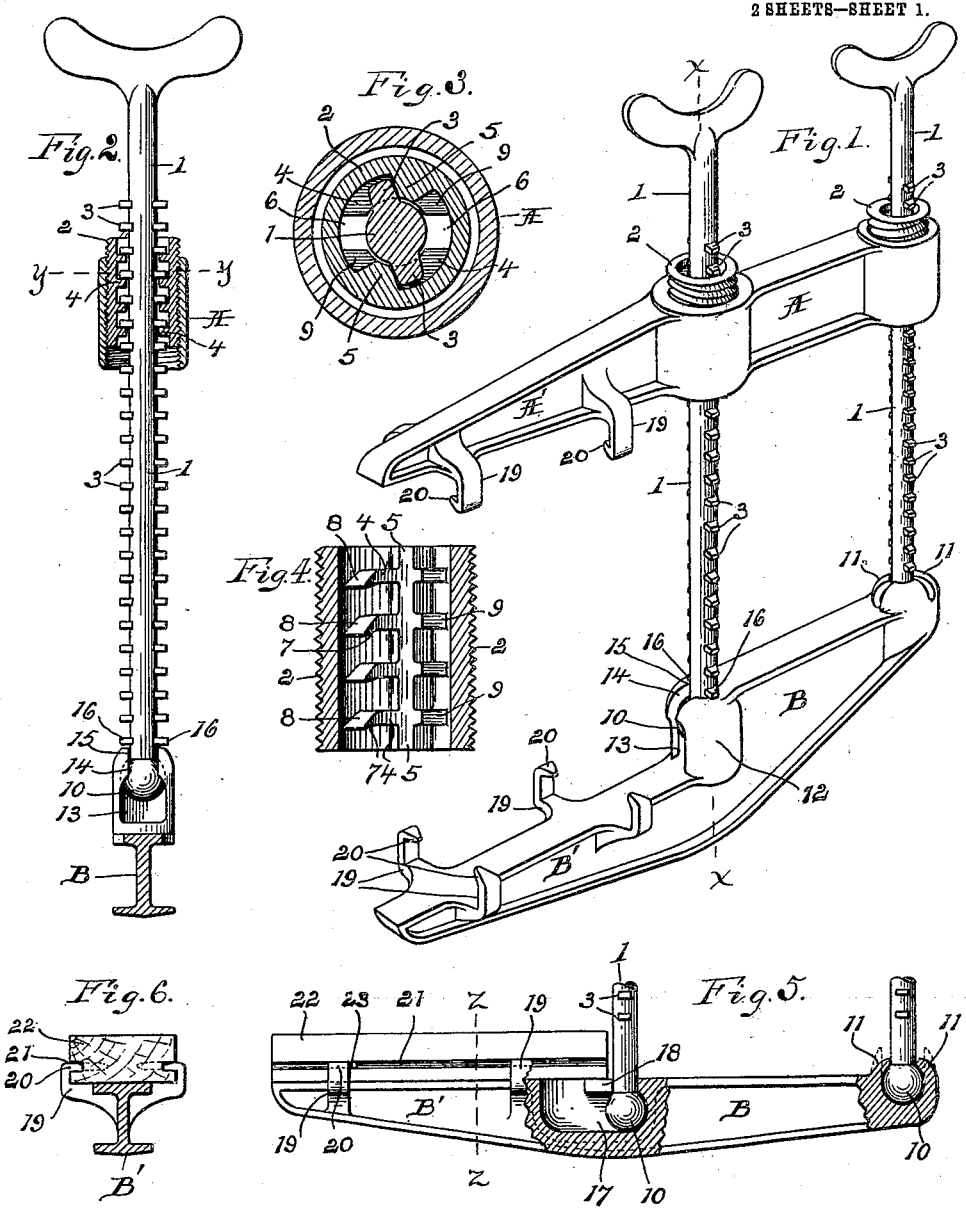

UNITED STATES PATENT OFFICE.

JOHN RIVERS, OF DETROIT, MICHIGAN.

CLAMP.

No. 922,336.  Specification of Letters Patent.  Patented May 18, 1909.

Application filed December 17, 1908. Serial No. 467,982.

*To all whom it may concern:*

Be it known that I, JOHN RIVERS, a citizen of the United States, residing at Detroit, in the county of Wayne and State of Michigan, have invented certain new and useful Improvements in Clamps, of which the following is a specification.

This invention relates to improvements in hand clamps and more particularly to such clamps adapted for use in wood work.

The object of the invention is to provide an efficient clamp for the purpose which may be very quickly and easily adjusted to the work and tightened thereon, such adjustment being secured by providing a construction adapted to embody and utilize the adjusting mechanism shown in my Letters Patent No. 898,604, dated Sept. 15, 1908.

The further object of the invention is to provide the device with certain other new and useful features all as hereinafter more fully described and shown in the drawings in which, Figure 1 is a perspective view of a clamp embodying the invention. Fig. 2 a vertical section of the same on the line x—x Fig. 1. Fig. 3 is an enlarged transverse section on the line y—y of Fig. 2. Fig. 4 is a vertical section of the bushing. Fig. 5 is a side elevation of the lower jaw of the clamp embodying a modified construction and having parts broken away to show the construction. Fig. 6 is a vertical section on the line z—z of Fig. 5. Fig. 7 is a side elevation showing a modified construction. Fig. 8 is a vertical section of the same. Fig. 9 is a sectional detail of one of the bushings of the lower jaw showing the stem in place therein.

As shown in the drawings the clamps consist of an upper clamping member A and a lower clamping member B which are moved toward each other to clamp the work between their projecting end portions or jaws A' and B' by the rods 1 attached at their lower ends to the lower clamping member and passing through externally screw threaded bushings 2 in the upper member. These rods which are provided with teeth 3 operate when turned to engage their teeth with the internal flanges 4 and vertical ribs 5 of the bushing, and turn said bushing in the clamping member to adjust said member toward or from the member B all substantially as shown and described in my Letters Patent before mentioned. The clamping member A is brought into contact with the work placed between the jaws of the members by turning the rods so that their teeth will be in alinement with the spaces 6 between the ends of said internal flanges in which position the rods will pass freely through the bushings. After being so adjusted the rods are turned to bring their teeth into engagement with the longitudinal ribs 5, and further turning of the rods will turn the bushings, the teeth thereof coming into contact with the flanges 4 which are preferably curved slightly at their ends 7 to prevent the teeth from slipping off or being accidently turned out of engagement therewith. The opposite side 8 of each of said flanges at said ends, is preferably beveled so that when the teeth are turned out of engagement with these inclined ends, pass into the next space between the flanges. The backward turning of the bushing, or the turning in the direction opposite to that just described, is accomplished by turning the rod in the opposite direction until its teeth engage the opposite side of the longitudinal rib 5 and the short flanges 9 extending laterally from this side of the rib. The intermediate bushing 2 or the one next to the jaw A' is preferably provided with a left hand screw thread and the other bushing with a right hand thread so that when the rods are turned to the right the jaw will be moved toward the work by the first named bushing and the rear end of the clamping member will be moved in the opposite direction or raised by the last named bushing thus tilting the member and bringing the jaw rapidly and firmly into contact with the work and increasing the power of the rod at the rear end of the clamp. Any desired thread may be used however, the rods being turned accordingly.

The rear rod of the clamp is provided at its lower end with a ball 10 to engage the socket formed in the rear end of the lower member B, and around the upper edge of this socket are formed a number of upwardly projecting tongues 11 which may be bent inward over the ball to attach the rod to the member. The forward rod is also provided with a ball 10 at its lower end to engage a suitable socket 12 formed intermediate the ends of the member B. This socket 12 is elongated and at its forward side is provided with an opening 13 and a slot 14 extending from the upper edge of said opening into an opening 15 in its top. The slot 14 and opening 15 are of the diameter of the rod and the opening 13 is just sufficient in width to permit of the insertion of the ball 10. The rod is engaged with the member B by inserting the ball through the opening 13 into the elongated socket then raising the ball to the upper end of the socket and turning the rod up through the slot 14 to a vertical position within the opening 15. The ball is prevented from dropping within this socket and thus permitting the same to escape laterally through the opening 13, by the teeth 16 which when the rod is turned to its vertical position engage the outer surfaces of the socket at its upper side. The rods are thus effectually attached at their lower ends to the lower clamping member and at the same time permitted to turn freely therein.

In the modified construction shown in Fig. 5, the jaw of the member B is in the same plane with its rear portion, the socket 17 therein to receive the ball 10 being elongated longitudinally of the member and having an opening at one end opening through the upper side of the member, of sufficient size to permit of the insertion of the ball into the socket. The slot 18 in the upper side of the socket, extends laterally from the opening through which the ball is inserted and is of a width equal to the diameter of the rod so that when the ball is inserted and the rod with the ball moved laterally in the socket, the rod engages in the slot and the ball is prevented from coming out. The jaws A' and B' are each provided with laterally extending arms 19 which are bent at right angles and provided with inwardly projecting lugs 20 at their upper ends adapted to engage grooves 21 in the sides of a wooden block 22 adapted to be slipped in between these arms upon the faces of the jaws to form a facing for said jaws and prevent injury to the work. These blocks may be held in place against longitudinal movement by small pins or nails 23 driven into the block at one side of one or more of the holding arms. The block on the jaw in the modified construction shown in Fig. 5 is adapted to cover the open end of the socket 17 and thus prevent the disengagement of the rod therefrom.

In the construction shown in Figs. 7, 8, and 9 the lower clamping member C is a duplicate of the upper member A and suitable externally screw threaded bushings constructed similar to those for the upper member are provided for the lower member to receive the lower ends of the rods. The screw thread for the lower bushing of each rod is preferably formed opposite to that of the screw thread of the upper bushing so that when said bushings are turned by the rods both the upper and lower bushings will operate to adjust its clamping member toward the opposing member. A quick clamping adjustment of the device is thus secured. The removal of the rods from their lower bushings is prevented by forming said bushings with sockets 24 at their lower ends to receive the balls of the lower ends of the rods and extending downwardly around these sockets are tongues 25 which may be bent inward over the balls to hold the same in place. In this construction the rods not only form the means for adjusting the clamping members toward each other, but also form guides for the upper member upon which said member slides freely toward and from the lower member. The particular arrangement of bushings and the screw threads thereon enable the operator to tighten the clamp upon the work with but a few turns of the rods which may be both turned in the same direction to operate the bushings in opposite directions through the clamping member and thus tilt said member.

Having thus fully described my invention what I claim as my invention is:

1. In a clamp, the combination of a movable member having a jaw at one end and openings therethrough at its other end, rods extending through said openings adapted to be turned to adjust the movable member thereon, balls on one end of said rods, a fixed clamping member formed with a jaw at one end, a socket at its opposite end to receive the ball on one of the rods, a second socket intermediate its ends adjacent to the jaw portion of said member, said intermediate socket being formed with an opening through the face of the member to receive the ball on the rod and a laterally extending slot to engage the rod adjacent to the ball when a ball is in place within the socket, a facing block upon the jaw with one end extending over the said opening into the socket to prevent the escape of the ball therefrom, and means for securing the facing block in place.

2. In a clamp, the combination of a movable clamping member having a jaw portion at one end, rods passing through said member to actuate the same, a fixed clamping member having a jaw portion at one end and means at its opposite end to pivotally secure one end of one of the rods thereto, a ball on the end of the other rod, a vertically elongated socket intermediate the ends of the fixed clamping member formed with an opening in one side adapted to receive the said ball, and a slot extending from the upper end of said opening and opening into the upper end of the socket to receive the rod adjacent to the ball, and means on the rod adjacent to the ball to engage the outer surface of the member adjacent to the slot.

In testimony whereof I affix my signature in presence of two witnesses.

JOHN RIVERS.

Witnesses:
 LEWIS E. FLANDERS,
 G. E. McGRANN.